United States Patent [19]

Kresnyak et al.

[11] Patent Number: 5,830,422

[45] Date of Patent: *Nov. 3, 1998

[54] METHOD FOR PRODUCTION OF SODIUM BICARBONATE, SODIUM CARBONATE AND AMMONIUM SULFATE FROM SODIUM SULFATE

[75] Inventors: Steve Kresnyak; Jake Halldorson, both of Calgary; Mark Hantke, Moose Jaw, all of Canada

[73] Assignee: Ormiston Mining and Smelting Co. Ltd., Ormiston, Canada

[*] Notice: The term of this patent shall not extend beyond the expiration date of Pat. No. 5,654,357.

[21] Appl. No.: 547,773

[22] Filed: Oct. 25, 1995

Related U.S. Application Data

[63] Continuation-in-part of Ser. No. 494,073, Jun. 23, 1995, Pat. No. 5,654,351.

[51] Int. Cl.$^6$ ................................................. C01D 7/37
[52] U.S. Cl. .................... 423/243.08; 423/423; 423/427; 423/548; 423/555
[58] Field of Search .................... 423/421, 423, 423/427, 243.08, 555, 548

[56] References Cited

U.S. PATENT DOCUMENTS

| | | | |
|---|---|---|---|
| 3,493,329 | 2/1970 | Stiers | 423/428 |
| 4,844,874 | 7/1989 | de Vries | 423/210 |
| 5,135,734 | 8/1992 | Ninane | 423/659 |

*Primary Examiner*—Michael Lewis
*Assistant Examiner*—Stuart L. Hendrickson
*Attorney, Agent, or Firm*—Paul S. Sharpe; Marks & Clerk

[57] ABSTRACT

A process for producing sodium bicarbonate and sodium carbonate. The process includes reacting within a reactor sodium sulfate in aqueous solution with ammonia and carbon dioxide to precipitate sodium bicarbonate and form a first mother liquor. The sodium bicarbonate is separated and dried to produce sodium bicarbonate product. Alternatively, the sodium bicarbonate may be calcined to convert it to sodium carbonate. The first mother liquor may be evaporated to precipitate unreacted sodium sulfate, with the formation of a second mother liquor. The second mother liquor may be cooled to precipitate a double salt of sodium sulfate/ammonium sulfate and water. A third mother liquor is formed from this process. The latter-mentioned liquor from the precipitation of the double salt is evaporated to precipitate a substantial pure ammonium sulfate in a purity of greater than approximately 75 wt %. A fourth mother liquor is formed. The double salt is added to the first mother liquor from the precipitation of sodium bicarbonate prior to the evaporation step and the fourth mother liquor is added to the second mother liquor from the evaporation to precipitate unreacted sodium sulfate.

17 Claims, 9 Drawing Sheets

METHOD FOR PRODUCTION OF SODIUM BICARBONATE, SODIUM CARBONATE AND AMMONIUM SULFATE FROM SODIUM SULFATE

This is a continuation-in-part of application Ser. No. 08/494,073 filed Jun. 23, 1995, now U.S. Pat. No. 5,659,351.

FIELD OF THE INVENTION

This invention relates to a process for generating sodium carbonate compounds and ammonium sulfate, and more particularly, the present invention relates to a process for generating sodium carbonate, sodium bicarbonate and ammonium sulfate in a commercially viable and substantially pure form.

BACKGROUND OF THE INVENTION

Several processes have been developed to manufacture alkaloid carbonate and various sulfate components. These methods have difficulty in producing components which are in pure or near pure state for commercial use.

Stiers, in U.S. Pat. No. 3,493,329, issued Feb. 3, 1970, teaches a method of making sodium carbonate. The Stiers method is a co-precipitation method and cannot provide for selective precipitation of desired products since the salts are reciprocal salts and form a double salt. In the Stiers method, the desire is to remove the sulfate anion to use it for the transportation of sodium cations from sodium chloride to the bicarbonating process as sodium sulfate. In addition to the above, the Stiers process involves the continuous recycling of the mother liquor which requires that the ammonium sulfate in the liquor be continuously removed or reduced from the process stream. If the ammonium sulfate reaches a saturation point in the bicarbonating stage, ammonium sulfate will co-precipitate with the sodium sulfate in the form of a double salt compound or two inseparable salts.

Stiers demonstrates a process to generate two salts and double salts rather than a pure single salt, the latter being much more desirable from a commercial point of view.

In view of what has been previously proposed in the art, it is clear a need exists for a process of recovering sodium carbonate compounds and the formation ammonium sulfate from a source of sulfate which overcomes the limitations regarding purity, precipitation, selectivity and other such limitations. The present invention is directed to circumventing the previously encountered difficulties of reciprocating salt pairs.

More recent attempts have been made to develop methods for producing sodium bicarbonate and ammonium sulfate from sodium sulfate in substantially pure quality such that these products can be used as commercial grade baking soda, and fertilizer.

Canadian Application Serial Number 2,032,627 offers an innovative technique to produce the desirable pure products. This method employed a number of evaporative and cooling techniques to alter the solubility of sodium sulfate and ammonium sulfate in solution and selectively precipitate the desired pure components. Lab bench scale batch testing of this method demonstrated effective results, however, continuous pilot scale testing clearly identified undesirable limitations to the process as specified. More specifically, the process is difficult to operate in a consistent and continuous mode and as such is highly susceptible to ammonia sulfate contamination with sodium sulfate, resulting in a commercially undesirable double salt product.

In greater detail of the teachings of the Canadian application, it is taught that brine remaining after screening sodium sulfate has a temperature of 95° C. and is saturated with both sodium and ammonium sulfate and that by cooling the mixture of both brines in a crystallizer from 95° C. to 60° C., the solubility of ammonium sulfate is decreased while the solubility of sodium sulfate increases. The result is that more ammonium sulfate precipitates while keeping sodium sulfate in solution.

By following the teachings, the mixed solution is supersaturated with sodium sulfate due to evaporations at 95° C. and specifically results in the production of double salt when the ammonium sulfate crystallization step of 60° C. is attempted as a continuous process.

In view of these limitations, advanced computer computation techniques were used to resolve the inherent process problems in the above-mentioned reference and achieve the present invention. The present invention assures that the correct operating parameters are maintained to effect a continuous process scheme and prevent inappropriate saturation and cross-contamination of the various streams with sodium sulfate or ammonium sulfate, thereby allowing precipitation of substantially pure products.

SUMMARY OF THE INVENTION

One object of the present invention is to provide an improved process for the recovery of substantially pure sodium bicarbonate and ammonium sulfate suitable for commercial purposes. Another object of the present invention is to provide a process for use on a continuous commercial scale which overcomes inherent difficulties with product contamination.

A further object of one embodiment of the present invention is to provide a process for producing sodium bicarbonate and sodium carbonate, which process comprises:

reacting within a reactor sodium sulfate in aqueous solution with ammonia and carbon dioxide to precipitate sodium bicarbonate and form a first mother liquor;

separating the sodium bicarbonate and drying it to produce sodium bicarbonate product or calcining it to convert it to sodium carbonate;

subjecting the first mother liquor from the precipitation of the sodium bicarbonate to evaporation to precipitate unreacted sodium sulfate, forming a second mother liquor;

cooling the second mother liquor from the precipitation of the unreacted sodium sulfate to precipitate a double salt of sodium sulfate/ammonium sulfate and water, forming a third mother liquor;

subjecting the third mother liquor from the precipitation of the double salt to evaporation to precipitate a substantial pure ammonium sulfate in a purity of greater than approximately 75 wt %, forming a fourth mother liquor;

adding the double salt to the first mother liquor from the precipitation of sodium bicarbonate prior to the evaporation; and adding the fourth mother liquor to the second mother liquor from the evaporation to precipitate unreacted sodium sulfate.

Another object of one embodiment of the present invention is to provide a method of desulfurizing a sulfur containing gas stream comprising:

(a) exposing the stream to oxidizing conditions to generate a sulfur containing compound;

(b) contacting the sulfur containing compound with a sodium carbonate compound to generate sodium sulfate; and (c) processing the sodium sulfate according to the method of claim 1.

A still further object of one embodiment of the present invention is to provide a method of recovering sodium bicarbonate and forming gypsum from a source containing sodium sulfate, comprising the steps of:

(a) providing a source of sodium sulfate;

(b) processing the sodium sulfate in accordance with the method of claim 1;

(c) contacting the saturated solution of ammonium sulfate from the process of claim 1 with lime; and (d) precipitating gypsum.

By practicing the above method, it has been found that selective precipitation of the single salts at high level of commercial purity is achievable on a continuous basis.

The solubility data for the single and multiple components at various temperatures, pressures and pH levels provide all the necessary guidance to effectively operate the process and effect the single component precipitation without contamination.

The process is further enhanced by providing an ammonia and carbon dioxide chemical recovery scheme for minimizing the chemical consumption to enhance commercial viability. It has been further found that by making use of the basic bicarbonate recovery process, that the process can be used for additional fields of utility, for example tail gas desulfurization, flue gas desulfurization by wet or dry sorbent injection techniques and further application for making commercial or landfill grade gypsum and fully recovering the ammonia chemical.

An additional enhancement to the process consists of condensing evaporation streams to recover process water, chemicals and heat energy, as well as eliminating undesirable environmental emissions. As will be further appreciated by those skilled in the art, the formation of the various precipitates and the processing with carbon dioxide and ammonia chemicals can create exothermic reactions, heating and refrigeration effects which are useful in the process, both directly and indirectly by external means.

After thus generally describing the invention, reference will now be made to the accompanied drawings illustrating preferred embodiments.

BRIEF DESCRIPTION OF THE DRAWINGS

Similar numerals in the drawings denote similar elements.

DETAILED DESCRIPTION OF THE PREFERRED EMBODIMENTS

The chemistry involved according to the present invention can be resolved into the following equations:

$$CO_2+H_2O=H+HCO_3$$

$$NH_3+H_2O=NH_4+OH$$

$$Na_2SO_4+2NH_3+2H_2O+2CO_2=2NaHCO_3+(NH_4)_2SO_4$$

Figure 1:
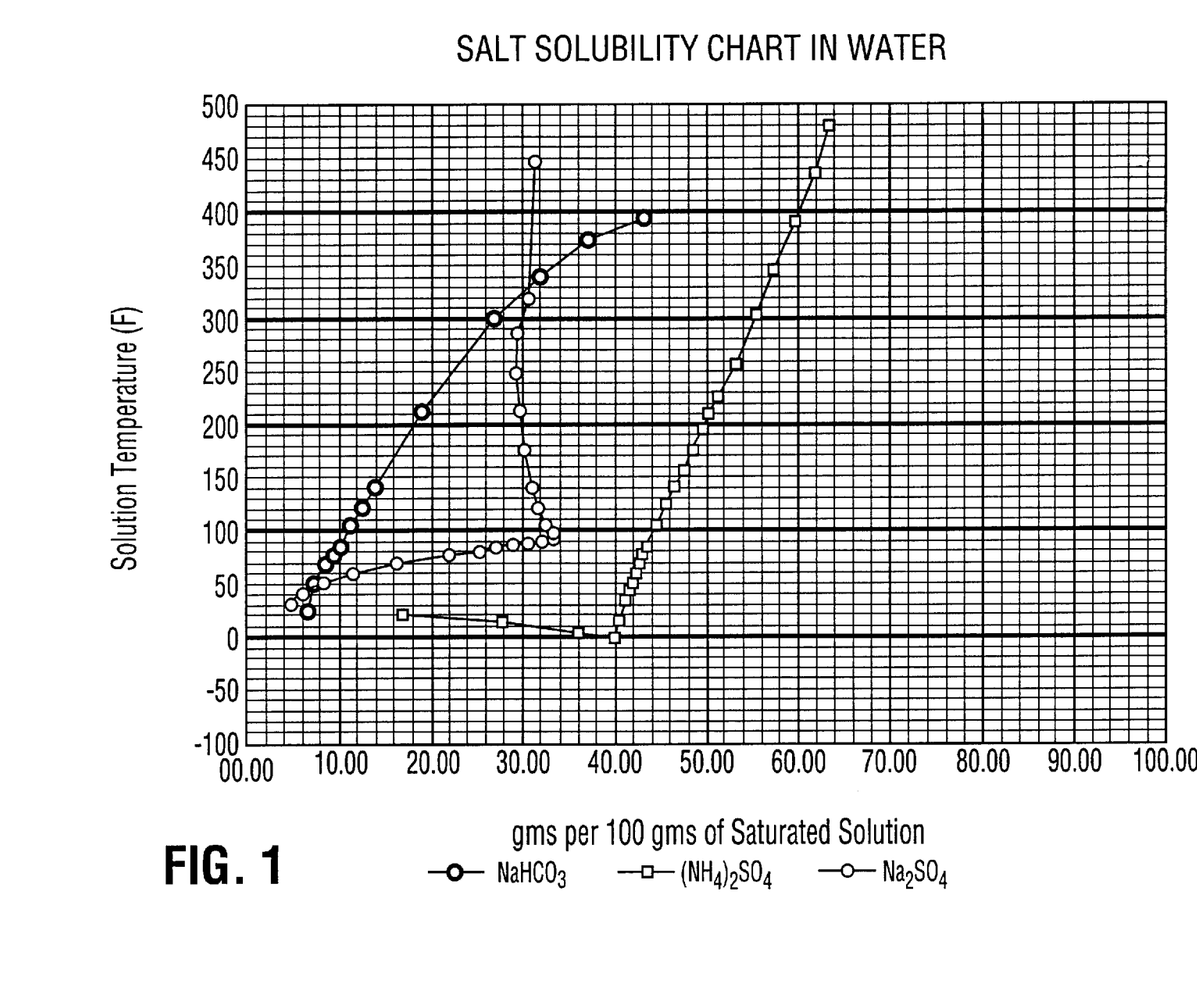
FIG. 1 is a graphical representation of the solubility of sodium bicarbonate, ammonium sulfate and sodium sulfate expressed as pure components in solution at various temperatures.

Referring now to FIG. 1, shown is a graphical representation of the solubility curves for pure components including sodium bicarbonate, ammonium sulfate and sodium sulfate. The data are expressed as a function of solution temperature. As is evident from the drawing, the solubility of the bicarbonate and the sodium sulfate have an overlapping area in which there will be a precipitation of both of these compounds. As indicated herein previously, the zones where solubility values are in conflict and the interaction effects of the mixed solution solubilities have posed a significant amount of difficulty in the prior art when one was attempting to obtain a substantially pure precipitate of sodium bicarbonate and ammonium sulfate without the formation of a sodium sulfate precipitate, double salts, hydrated salts or any mixed combination.

It has been found that if one simply obeys the solubility data, sodium bicarbonate and ammonium sulfate can be precipitated from a solution containing the molecular species indicated hereinabove without contamination of one precipitate with the other and further without the simultaneous precipitation of the sodium sulfate and double salts as a contaminant.

It has been found that if the sodium bicarbonate solution is maintained at a temperature of at least 32° C., under the conditions as set forth with respect to the data in FIG. 1, that the sodium bicarbonate can be precipitated while the unreacted sodium sulfate remains in solution. If the temperature drops prior to the precipitation of the sodium bicarbonate, the result is that a precipitate of sodium sulfate solvate or decahydrate will plate out of solution offering tremendous operating difficulties.

In a chemical system as set forth with respect to the above equations, the system is generally a complex quaternary system, having a reciprocal salt pair relationship as follows:

$$2(NH_4)HCO_3+Na_2SO_4=2NaHCO_3+(NH_4)_2SO_4$$

In aqueous solutions above approximately 30° C. ammonium bicarbonate is unstable and dissociates in solution as ions. This reduces the system to a complex tertiary system with complications related to hydrate formation and double salt formation. The system and phase equilibrium can be represented on an isothermal diagram which can be employed to obtain higher purity levels of single components.

The first step in the process is to complete the reaction to drive the equilibrium in the final equation such that the substantially pure sodium bicarbonate crystals are formed. As is known in the art, numerous possible methods can be practiced for contacting the ammonia and the carbon dioxide with the sodium sulfate solution. As an example, the ammonia may be introduced into a solution of the sodium sulfate and carbon dioxide dispersed through the solution or the carbon dioxide dispersed through the saturated sodium sulfate solution and the ammonia subsequently added or both components may be dispersed through the solution simultaneously. Another possible alternative includes the use of ammonium carbonate or ammonium carbonate compound.

Figure 2:
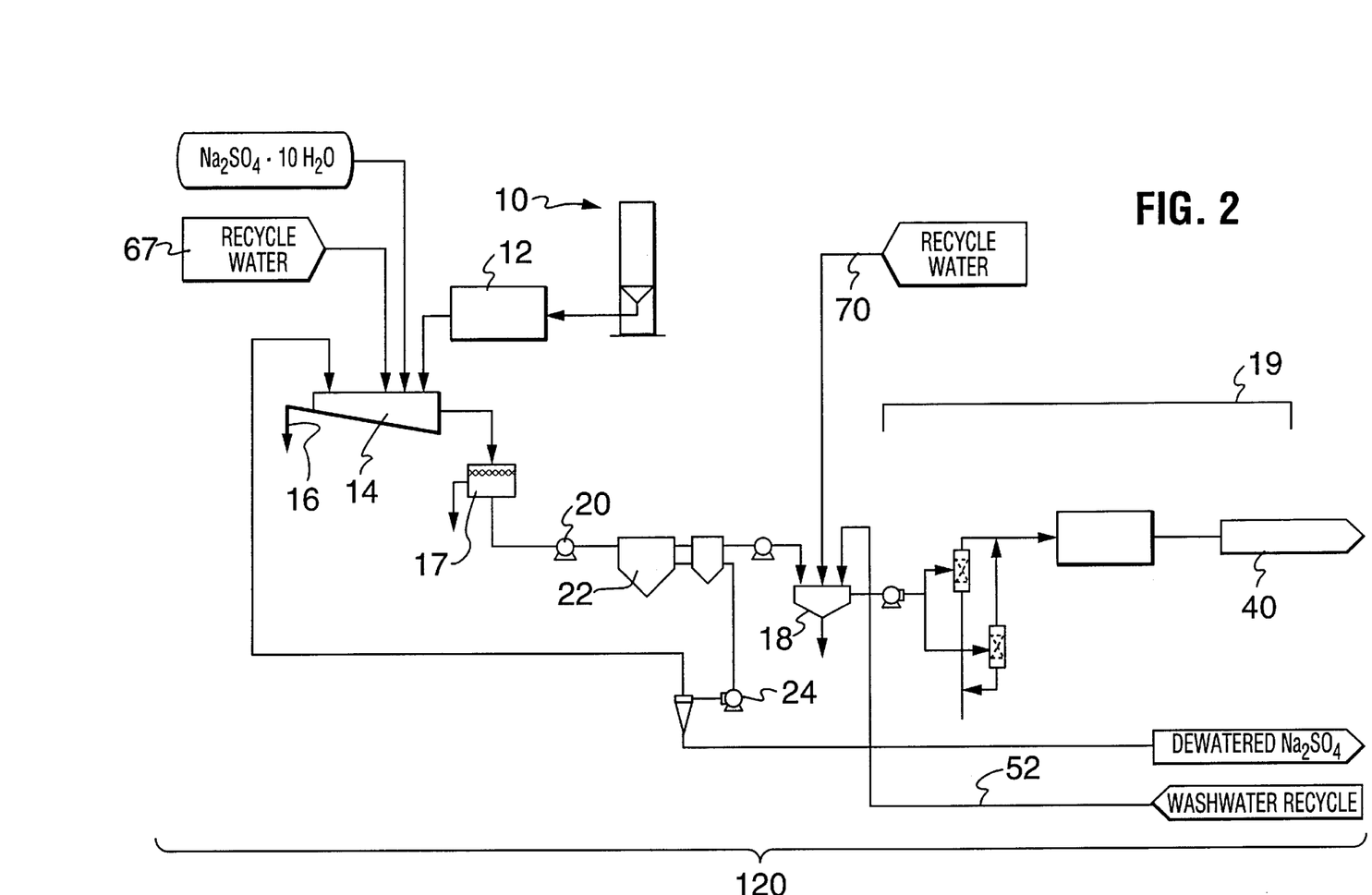
FIG. 2 is a flow chart illustrating the preparation of saturated sodium sulfate brine from the natural sodium sulfate source known as Glauber salt and from a by-product sodium sulfate source.

Referring now to FIG. 2, shown is one possible process route according to the present invention. A natural source of sodium sulfate can be found in vast reserves of Glauber's salt (sodium sulfate decahydrate). FIG. 2 schematically illustrates a mechanism of concentrating and conditioning the sodium sulfate feed brine from Glauber's salt feed stock. The process is globally referenced by numeral 120.

Numerals from all of the figures will be referred to in reference to specific figures in view of the interrelation of the individual process schemes.

In greater detail, FIG. 2 shows the basic scheme by which sodium sulfate by-product can be introduced to the process. As an example, flyash, from commercial steam boilers containing various levels of sodium sulfate may be collected from hot flue gas streams and transferred into a collection silo 10. From the silo, the flyash can be separated by commercially known dry or wet methods, globally indicated at 12, whereby the material may be transferred into an atmospheric mixing container 14, which container 14 is maintained at a temperature from between about 32° C. and 42° C. Course insolubles, typically consisting of rocks, sand and clay fines, are separated at 16 and 17. Finer material is flocculated and separated from the sodium sulfate solution once passed through a clarifier 18. The final brine or filtrate, represented by numeral 40, is then further clarified and further filtered by filters, globally shown at 19, if necessary, to polish the solution free of ultra-fine insolubles and potential heavy metals. Insolubles are removed from the clarifiers and filters and disposed of by suitable means. Heat energy is typically applied to the melting tank 22. Evaporation may also be required in tank 22 to achieve a sodium sulfate concentration at the desired maximum solution solubility. Circulating pump 24 is required to prevent the formation of encrustations in the sulfate brine preparation unit by reducing the temperature increase of the circulating melt solution.

It has been found that one of the main difficulties which previously plagued methods practiced in the prior art, was that the temperature of the sodium bicarbonate formation reaction was not maintained within the above-mentioned parameters. The result of this is the formation of a solvate or hydrate commonly referred to as Glauber's salt ($Na_2SO_4*10H_2O$). Another difficulty which previously plagued methods practiced in prior art, was the formation of ammonium bicarbonate. It has been found that by maintaining the temperature within the above-stated range, the Glauber's salt and ammonium bicarbonate does not form and therefore does not affect the sodium bicarbonate formation process. In addition, at this temperature, a maximum amount of salt can be put in solution which reduces the feed circulation rate required of brine 40.

Figure 3:
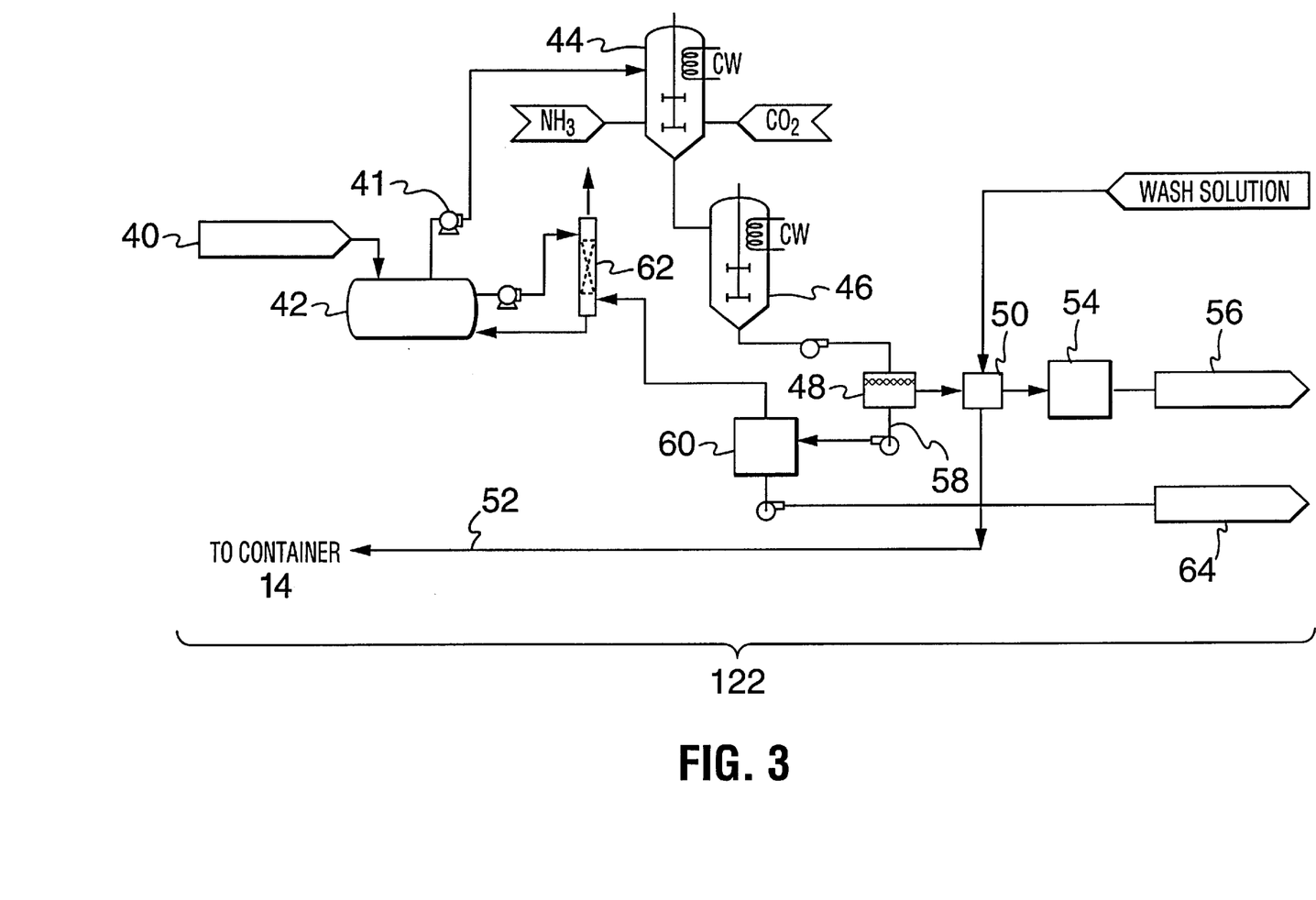
FIG. 3 is a flow chart illustrating the sodium bicarbonate production unit and gas recovery scheme.

With reference to FIG. 3, once the insolubles have been removed by the clarifier and filters, and the brine 40 is concentrated to its highest salt saturation level, the solution or brine 40 is presaturated in tank 42 with ammonia and carbon dioxide and then is passed, for example, pumped by pump 41, into at least a first main reactor 44 or multiple reactors where the formation of the sodium bicarbonate occurs. The temperature within the reactor 44 may vary depending on the reactor configuration. The final temperature of the solution will be progressively reduced to about 21° C. to 18° C. with the brine feed temperature to the reactor 44 being maintained above 32° C. The final temperature of the solution maximizes the bicarbonate yield and if not exceeded, prevents contamination with $Na_2SO_4$. Any suitable solvent may be employed and it will be apparent to those skilled in the art which are suitable possibilities to cover all pressure, temperature and other proposed conditions. Pressure in reactor 44 will preferably be maintained at approximately 350 kPa(g) to approximately 1750 kPa(g). Although not essential, this ensures the ammonia remains dissolved in solution to create the most effective reaction. A crystallizer 46 may be included downstream to effect crystallization of the sodium bicarbonate. Once the crystals have formed, they may be removed from the reactor 44 and/or crystallizer 46 through a filter means 48 which may comprise a pressure or non-pressure-type filter. Once the crystals are removed, they may be passed to a further filtration medium (not shown), an example of which may be a filtration screen or rotary centrifuge device (not shown), at which point the formed crystals may be washed with saturated cold sodium bicarbonate brine or methanol as indicated at 50 and dried with dryer 54 or calcined to form sodium carbonate. A high yield is achievable. The wash may be then returned via line 52 mixing container 14. The formed bicarbonate crystals, denoted by 56, may be then removed from the system for further uses.

The filtrate or brine 58 from the first reactor 44 is reheated to approximately 80° C. to 95° C. in a gas recovery boiler 60, where reactivated ammonia and carbon dioxide gases are released from the brine. The gases are routed to a gas recovery contactor 62 where they are subjected to the raw sodium sulfate feed brine and absorbed into solution to presaturate the feed to the bicarbonate reactor 44. This process reduces the chemical consumption requirements.

Figure 4:
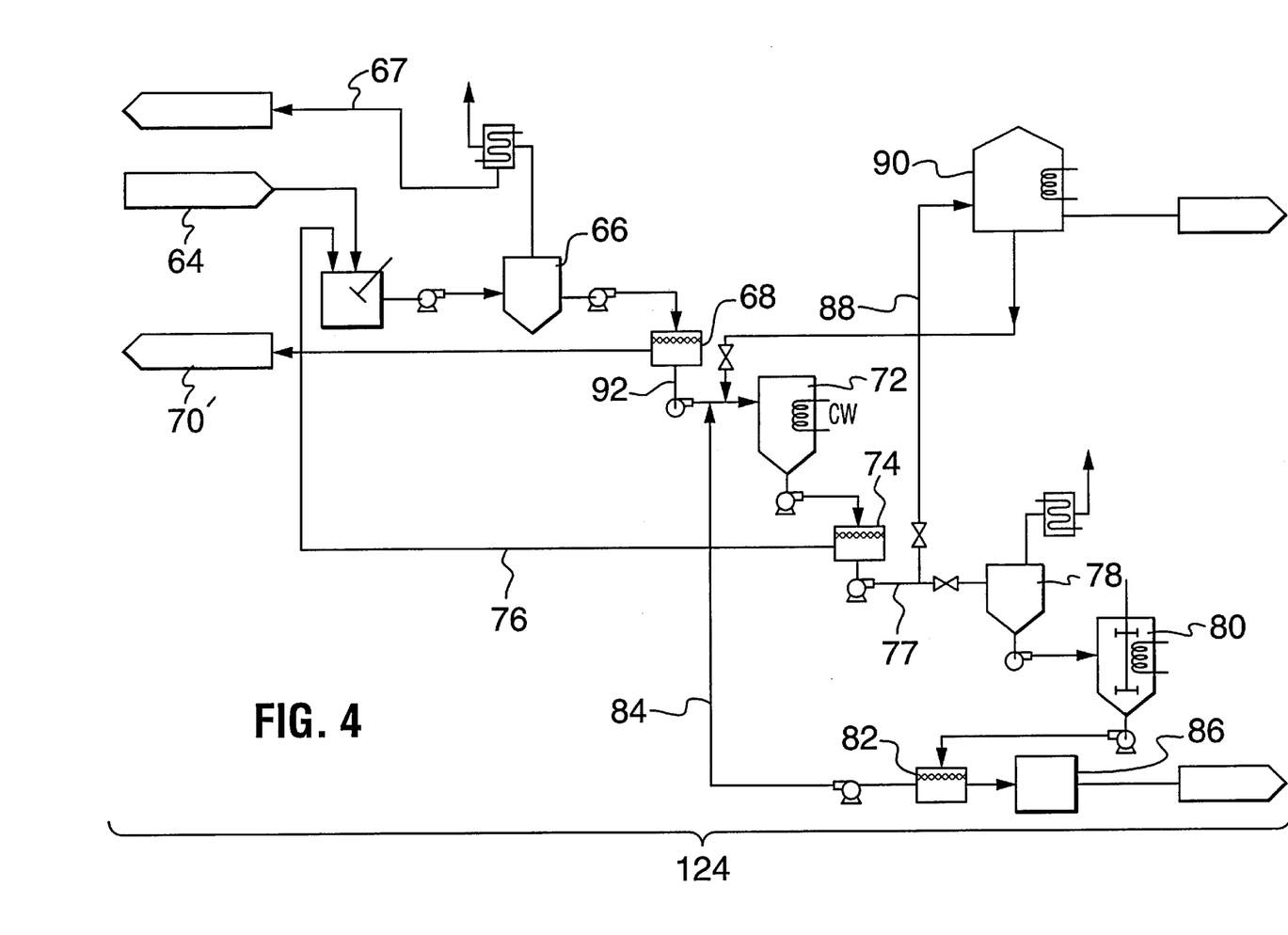
FIG. 4 is a flow sheet illustrating the separation scheme for production of ammonium sulfate fertilizer in both the liquid and solid crystal form.

The filtrate solution, denoted by numeral 64, in FIG. 4 is subjected to a first evaporation step in evaporator 66 to condition the brine by reducing the level of unreacted and residual sodium ion in the solution. As the saturation level of the brine is obtained, sodium sulfate crystallizes from the solution before the saturation level of ammonia sulfate or double salt is achieved. The sodium sulfate crystals are filtered at filter 68 from the first evaporation brine and washed and dried as salt cake product of high purity or recycled as indicated by 70' as feed stock.

The filtrate 92 from the first evaporation for brine conditioning is then cooled to approximately 20° C. where crystallization of sodium sulfate and ammonium sulfate occurs in the form of a hydrated double salt ($Na_2SO_4*(NH_4)_2SO_4*4H_2O$). or double salt/pure salt mix in crystallizer 72. The double salt crystals are filtered by filter 74 from the cooled brine and redissolved into the first evaporator feed brine 64 via line 76. At this point the brine 77 obtained after filtering off the double salt, contains significantly reduced levels of sodium to effect concentration and/or crystallization of substantially pure ammonium sulfate as a solid or liquid form. This product may be then removed from the system via line 88 as a liquid and stored in vessel 90 or transferred to a fertilizer evaporator or crystallizer 80 to be transferred to the solid crystal form.

If a solid crystal form is desired, then the near saturated ammonia sulfate brine is exposed to a final evaporation step with step in crystallizer 80 to precipitate out the ammonium sulfate in a substantial crystal size and purity of greater than 75 wt %, allowing it to be immediately used as agricultural fertilizer. The crystals are filtered with filter 82. The saturated filtrate solution from the second evaporation step is recycled via line 84 to mix with the feed brine 77 to the double salt cooler/ crystallizer to further enhance the concentration process. The filtered crystals may then be dried with dryer 86.

Advantageously, a liquid fertilizer stored in vessel 90, which may be heated, affords the user the opportunity of blending the liquid product with other fertilizer components and further permits crystallization of the product as a mixed desired form. The liquid in vessel 90 may optionally be subjected to further evaporation and concentration to create a supersaturated fertilizer solution.

As can be realized by those practiced in the art, various heat and other energy recovery schemes can be incorporated to improve the overall energy balance of the process. For example, the vapours released during the evaporation steps can be condensed to recover clean makeup water and minimize ammonia and carbon dioxide losses, as well as recover significant heat energy. Further, the process contains exothermic reactions and refrigeration effects when using ammonia and carbon dioxide at various concentrations, temperatures and pressures. These effects can be used both internally and externally to improve the process heat balance. The evaporation steps can be performed at any reasonable pressure, and corresponding temperature whether atmospheric, vacuum or super atmospheric. This pressure can be determined to be the optimum operating parameter to maximize product quality and minimize energy requirements. The preferred pressure is approximately atmospheric or partial vacuum condition.

Although the process as discussed herein has been indicated to be primarily conducted in water, it will be understood by those skilled in the art that any suitable solvent can be used provided the choice of solvent does not vary the solubility relationship necessary to effect the process. As one possible alternative, glycol or glycol/water mixtures may be employed as the solvent.

With further reference to FIGS. 3 and 4, the overall process may include an additional washing step for washing the sodium bicarbonate and ammonium sulfate precipitates separately. In one possible configuration, the sodium bicarbonate which is formed in the reactor, may be passed into contact with a washing material, an example of which may be a source of methanol. The resulting filtrate may then be returned to a separation container. Similarly, the ammonium sulfate crystals, may be passed through a second independent source of methanol with the filtrate being returned to a separation container. The ammonium sulfate crystals and bicarbonate can be used for further uses.

Figure 5:
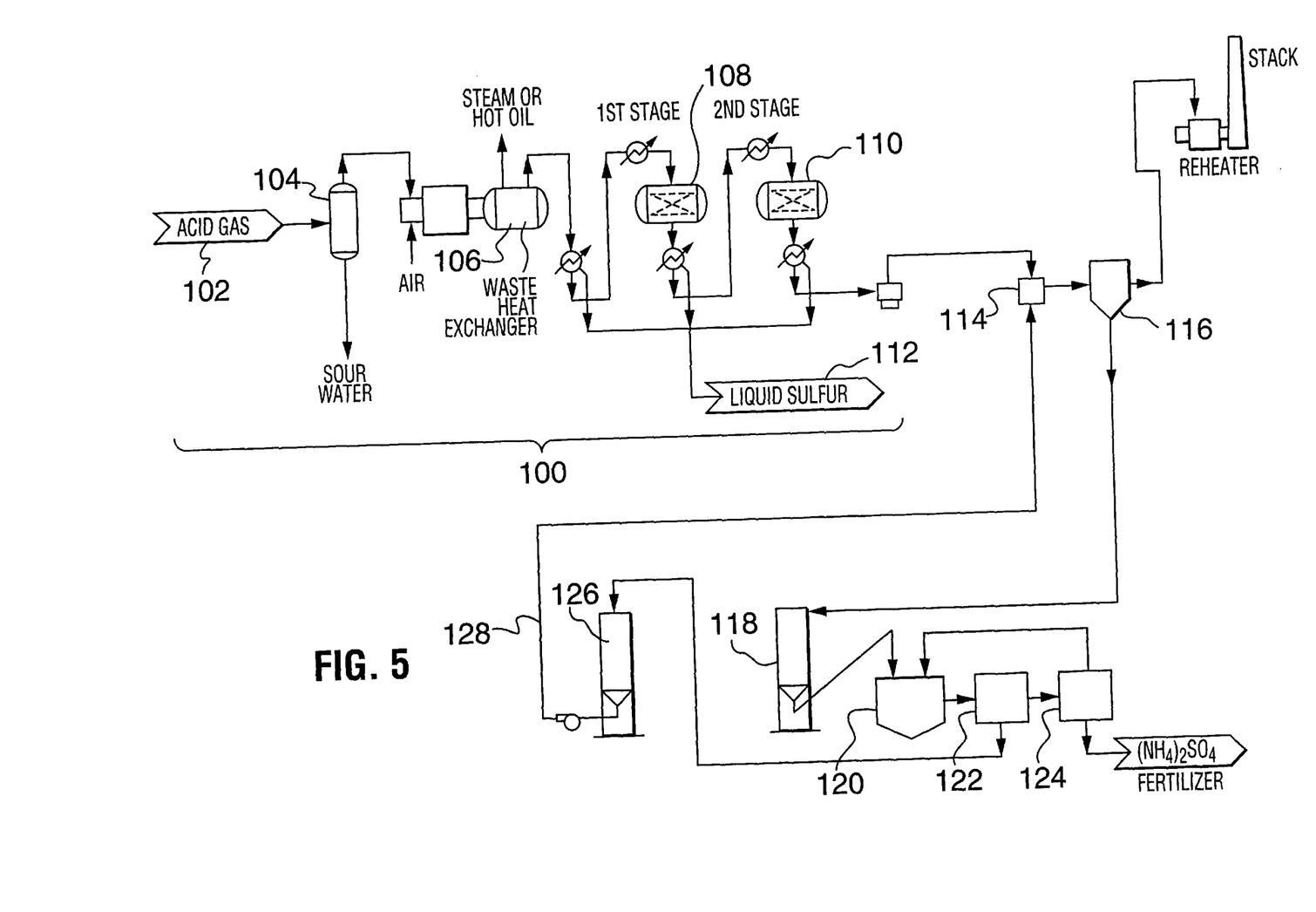
FIG. 5 is an alternate embodiment illustrating how the process can be adapted to Tail Gas Desulfurization scheme.

FIG. 5 shows a variation on the process where the bicarbonate recovery systems as set forth herein previously can be combined to be useful in a sulfur recovery plant. Generally speaking, the area designated by numeral 100 in FIG. 5 illustrates conventional apparatus employed for sulfur recovery from an acid gas stream by employing the modified Claus reaction, consisting of a single or multiple variation of thermal and catalytic recovery steps. Generally, the Claus process includes a feed of acid gas, globally denoted by numeral 102, which is passed into a container numeral 104, for removal of sour water. The stream is then passed into a reaction furnace and waste heat exchanger, denoted by numeral 106, where the thermal conversion occurs. The stream is then passed into a first catalytic stage conversion system, numeral 108, and subsequently into a further conversion, denoted by numeral 110 which may comprise "n" stages. Liquid sulfur is removed from the stages at 112. The stream is reheated and passed into a mixing unit 114 and then further into a collection device 116, which may comprise an electrostatic precipitator or baghouse. The solids from the collection device 116 are passed into a silo 118 and subsequently into a feed preparation on it specifically set forth as FIG. 2 at tank 120. From the feed preparation tank 120, the feed is processed in accordance with the bicarbonate recovery system, globally denoted by numeral 122 and specifically set forth in the description for FIG. 3. The product may then be transferred into a fertilizer recovery unit 124, the details of which have been set forth in the description for FIG. 4. The resulting product is commercial grade fertilizer. As an option, the sodium bicarbonate feed from the bicarbonate recovery unit 122 may be passed into a dry sorbent injection unit 126 and the bicarbonate then reintroduced into the system via line 128.

It is well known to those skilled in the art that the Claus process is useful for desulfurization. Generally speaking, the process is effected in two steps, namely:

This generally results in an elemental sulfur recovery of approximately 90% to 96% in a liquid sulfur state. The remaining sulfur containing component is recovered in sulfur recovery techniques such as tail gas cleanup units. By employing the recovery process as set forth herein previously, sodium bicarbonate can be introduced into the oxidized tail gas stream containing residual sulfur compounds and results can therefore be the production of ammonium sulfate as indicated in FIG. 5. By combining the modified Claus process with the processes as set forth herein, the result is the overall sulfur removal of the order of at least 95% or greater.

Figure 6:
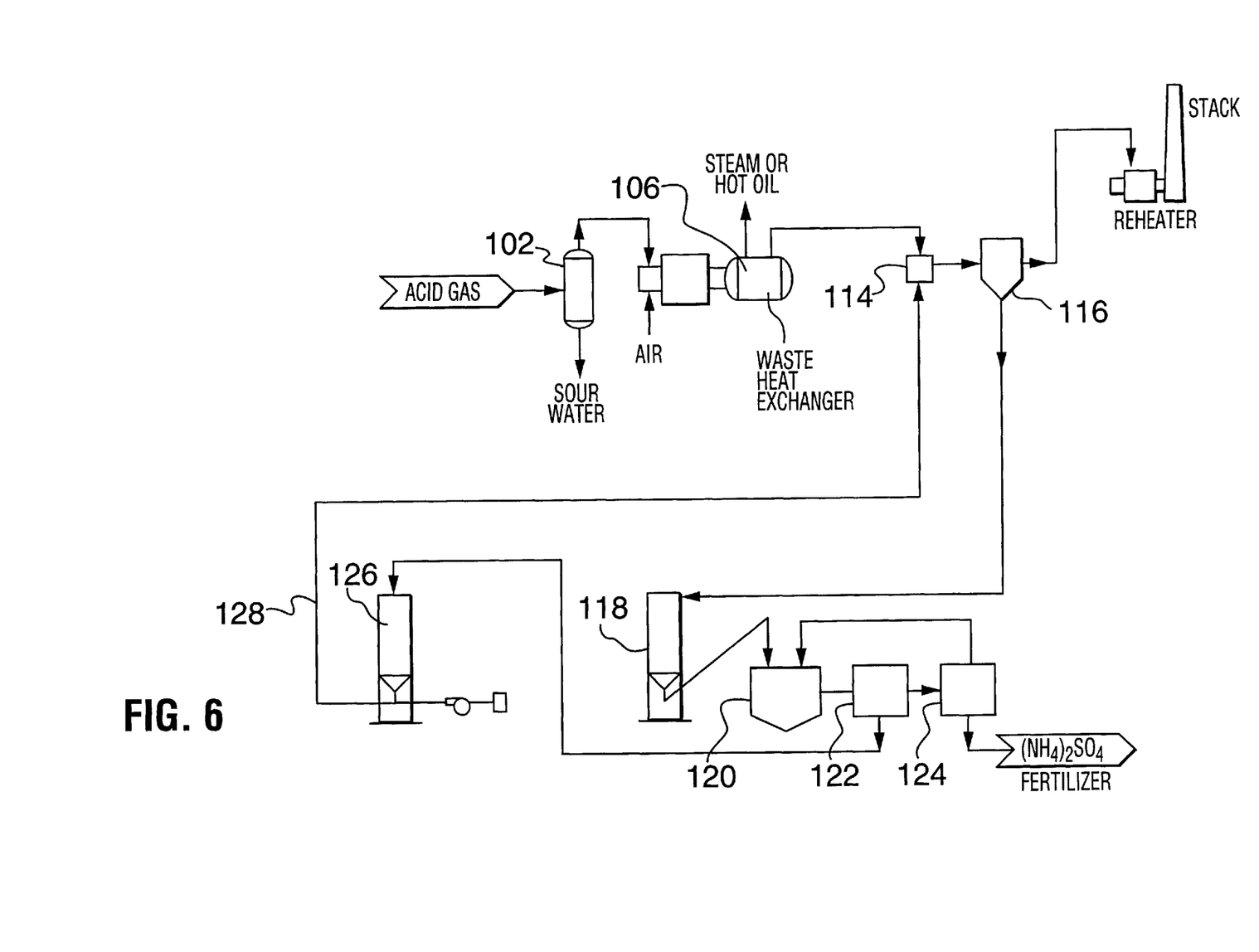
FIG. 6 is a further alternate embodiment of the process set forth in FIG. 5.

Turning to FIG. 6, shown is a variant on the process schematically illustrated in FIG. 5, but for a lower volume production sulfur plant, typically having production levels of less than 10 MTD where economic constraints preclude the recovery of elemental sulfur as shown in FIG. 5.

The acid gas stream may be as an alternative directly treated with liquid sodium bicarbonate or carbonate solution for desulfurization and form an alternate sulfur product.

Figure 7:
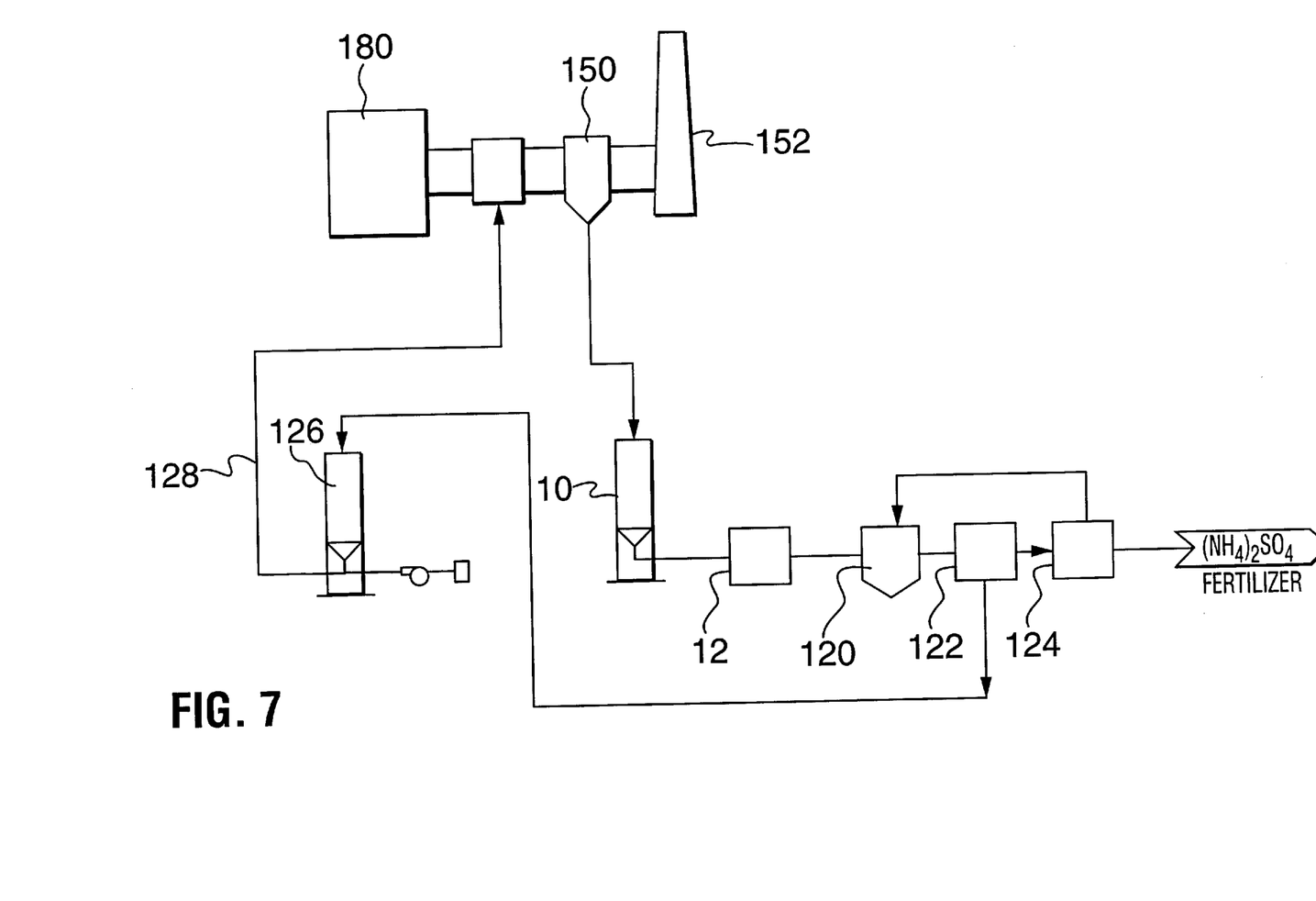
FIG. 7 is a flow sheet that illustrates how the process can be adapted to regenerate sodium bicarbonate from captured sodium sulfate in a Flue Gas Desulfurization (FGD) scheme using a Dry Sorbent Injection (DSI) technique.
Figure 8:
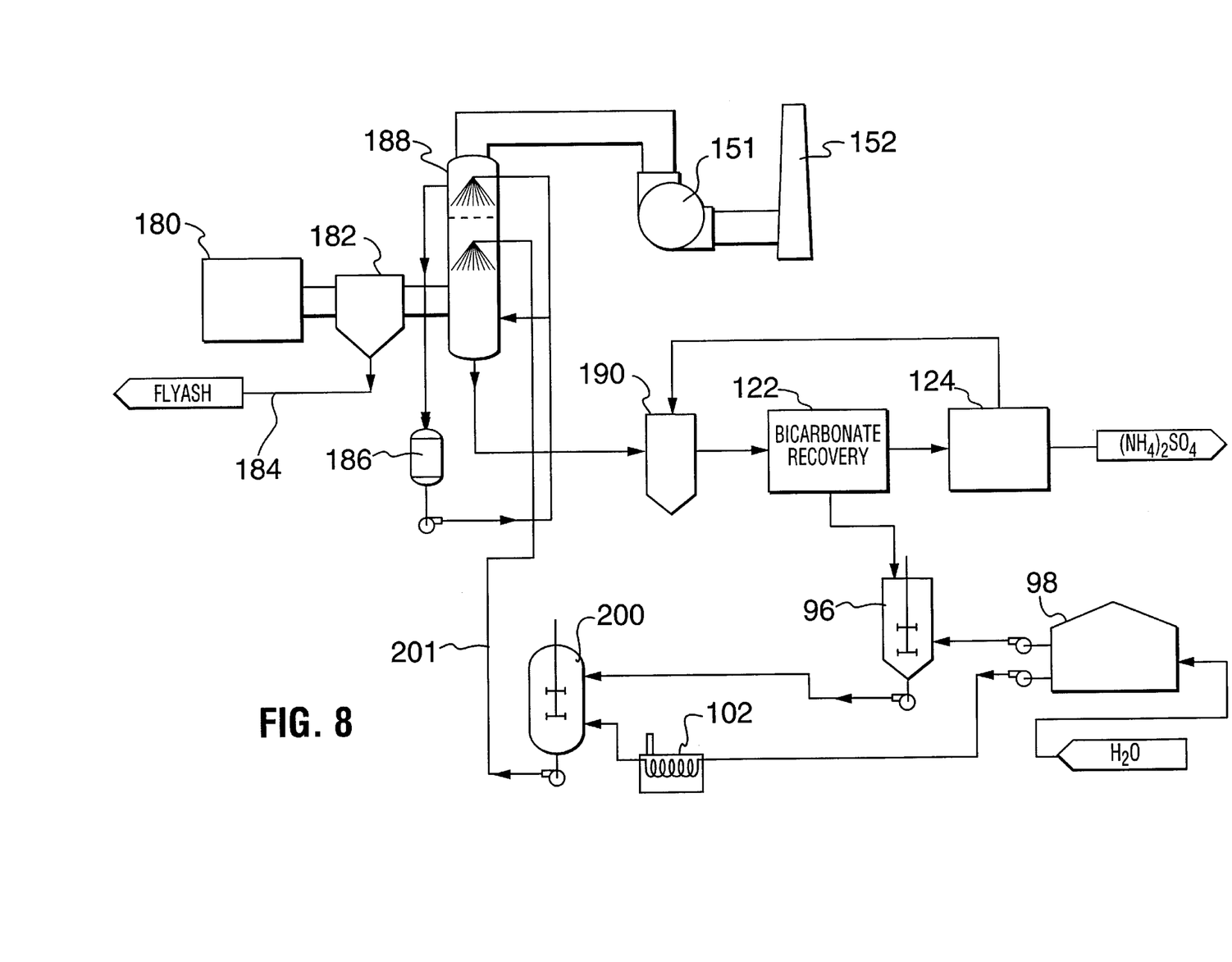
FIG. 8 is an alternate embodiment illustrating how the process can be adopted for use in a Wet Scrubbing Flue Gas Desulfurization scheme to regenerate the sodium bicarbonate from the captured sodium sulfate solution.

Turning to FIGS. 7 and 8, shown are further variations on the overall processes according to the present invention. Schematically illustrated in FIGS. 7 and 8, dry sorbent and wet scrubbing flue gas desulfurization techniques employ sodium carbonate and/or bicarbonate as the active reagent.

With more specific reference to FIG. 7, there is illustrated an effective scheme whereby the recovery process as set forth herein, can be employed to regenerate dry sodium sulfate captured from a particulate collection device 150 such as an electrostatic precipitator or baghouse and produce sodium bicarbonate to be injected into the flue gas stream to primarily reduce sulfur components from sulfur sources such as an industrial boiler 180 and released by means of a stack 152. The practice of injecting a dry chemical into the hot flue gases is commonly referred to as dry sorbent injection (DSI). By adapting the recovery process, discussed with respect to FIG. 3, to the DSI technique, the overall scheme becomes a continuous regenerable process with no waste streams or landfill requirements, no appreciable losses, and all by-products are immediately commercially useable. Using dry sodium bicarbonate as the reagent offers the additional advantages of further recovery of other undesirable components such as $NO_x$, HCl and $SO_3$ from the flue gases, and improve the performance of the downstream collection device 150 (i.e. ESP or baghouse). The dry sorbent technique in addition, will not appreciably affect the temperature of the flue gases, thereby maintaining or improving the effluent emission dispersion from the stack 152.

The sodium sulfate containing flyash compound is transferred from the collection device 150 and stored in a silo 118 (FIG. 6). As required, the material is separated by either wet or dry separation techniques denoted as 119 and blended into the feed preparation tank 120 (FIG. 6). The feed is processed in the bicarbonate recovery system 122 and the sodium bicarbonate is passed into a dry sorbent injection unit 126 and reintroduced into the system via line 128. By-product from the bicarbonate recovery unit 122 is further transferred to the fertilizer recovery unit 124, the resulting product is commercial grade fertilizer.

An alternate approach may consist of installing a retrofit injection and collection loop in parallel with or downstream of a collection device to permit the installation of a trim five gas desulfurization scheme. This will reduce or eliminate contamination of the flyash with sodium sulfate and prevent the requirement for flyash/sulfate separation unit.

FIG. 8 illustrates a scheme by which the process can be modified to produce a specific sodium carbonate or bicarbonate mixed or pure solution which can be adapted for use in a wet scrubber. Flue gas from the industrial boiler or tail gas unit, globally denoted by numeral 180, is passed onto an electrostatic precipitator or baghouse 182 or other recovery device to remove flyash at 184. A water wash container 186 is provided to circulate wash water in a single or multi level upper section of a wet scrubber 188 and accumulated levels of precipitates and fluids are drawn off and passed to the lower section of the wet scrubber 188. Once sodium sulfate at the desired concentration level is collected from the bottom of the wet scrubber 188 as a product of the scrubbing procedure, it is then further transferred to feed preparation tank 190 for thickening and clarification to a saturated state for feeding into reactor (not shown) from the bicarbonate recovery unit, globally referenced as 122 and shown as FIG. 3. From the reactor in the bicarbonate recovery unit 122, sodium bicarbonate is filtered from the solution and washed in either open screen, pressure type or combination of these (generally shown at 48 in FIG. 3). The bicarbonate precipitate is washed and reduced to less than 10% liquid and then fed as a slurry into a bicarbonate slurry container 96 at approximately 700 kpa(g). At this point, the bicarbonate slurry in container 96 is mixed with clean water supplied to container 96 from a feed water supply container 98. The feed water is maintained at a temperature of approximately 48° C. The slurry is continually mixed and ranges in a concentration from about 20 wt % to about 40 wt %. The slurry is then transferred to a high pressure solution container 200 at a pressure of approximately 1050 kPa(g), where a saturated solution is formed. A saturated bicarbonate solution is created using additional feed water from container 98 which is heated to approximately 176° C. by an injection water heater 102. The final saturated concentrated solution is then injected into wet scrubber 188 by means of line 201 for sulfur dioxide removal.

The temperature, pressure and concentration of reagent in the final injection solution can be varied to control the level of $SO_2$ removed, the desired pH of the system solutions and the final flue gas temperature exiting the wet scrubbing process. As a further example, the pressure of the injection system can be reduced to near atmospheric conditions prevalent in the wet scrubber 188. The temperature can then be reduced to near 49° C. to eliminate water heater 102 and the high pressure reactor 200. This will result in a cooler final flue gas temperature resulting from the evaporative cooling effect which may or may not be detrimental to any specific application.

In addition, it will be appreciated by those skilled in the art, that the wet scrubber 188 can take any form of contacting the reactant solution with the sulfur containing flue gas, for example, spray dryers, etc.

It will also be appreciated by those skilled in the art, that sodium carbonate can be used as a replacement or combined in various ratios with sodium bicarbonate to effect or enhance the wet and dry scrubbing techniques. The conversion can easily be accomplished by calcining the bicarbonate in a dry form or by increasing the temperature in a liquid form to alter the bicarbonate to carbonate form. The ammonia used in the process can be recovered in a recovery process as set forth herein with respect to other embodiments and this is equally true of the ammonium sulfate and other compounds in the process.

Figure 9:
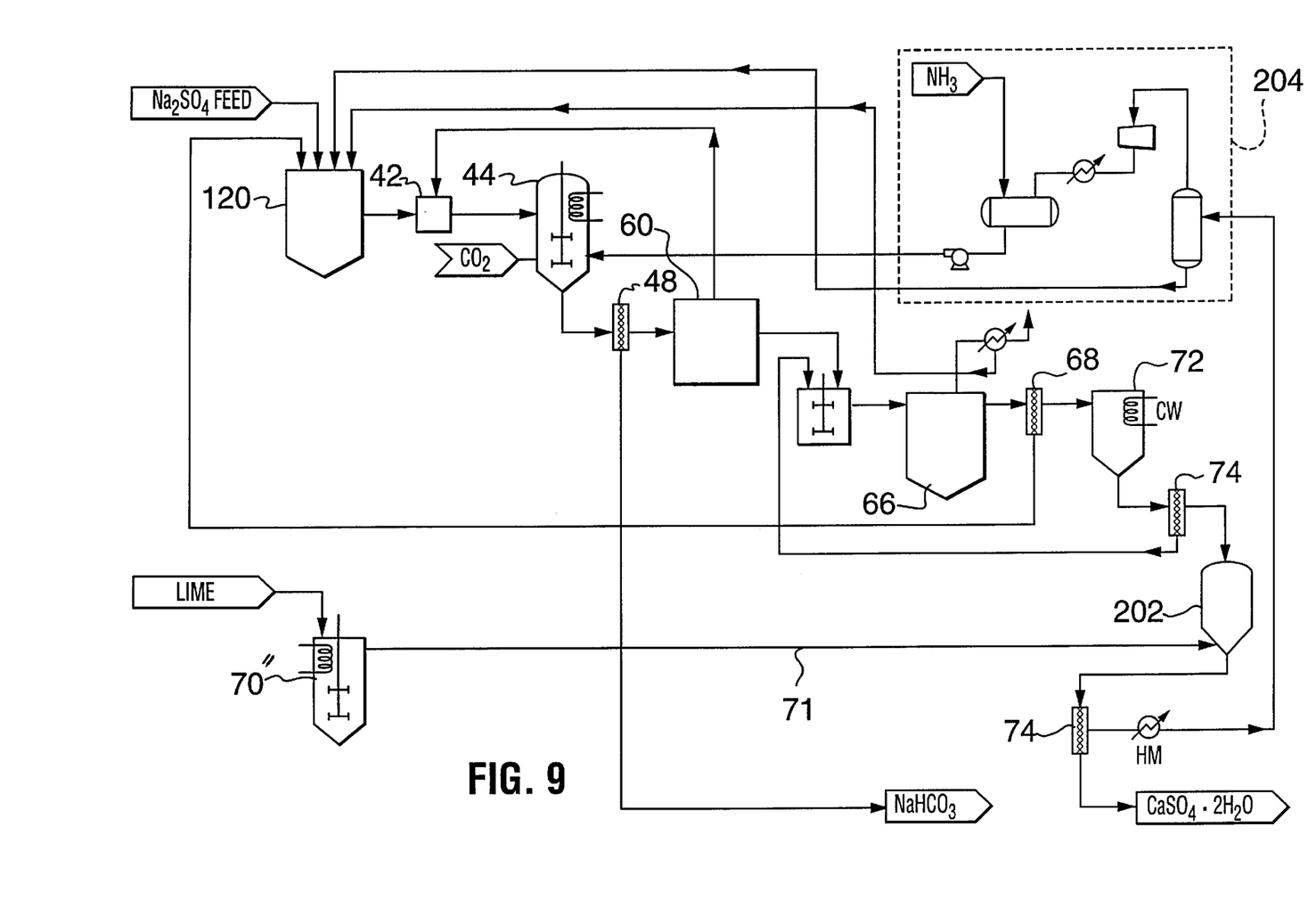
FIG. 9 is a further embodiment by which the process can be adapted to produce gypsum and fully recover the ammonia.

Turning to FIG. 9, showing schematically is a further embodiment according to the present invention. The embodiment shown, a lime mixing container 70' is provided for retaining lime in any form, e.g. a slurry or powder form to be introduced into reactor 202 via line 71. By providing this addition to the recovery unit, commercial or landfill gypsum can be produced along with sodium bicarbonate as illustrated in the flow chart in FIG. 9. As a further feature, the arrangement shown may include ammonia recovery unit 204 which will include the usual gaseous recovery means well known to those skilled in the art. This is useful since the ammonia is liberated subsequent to precipitation of gypsum and therefore can be easily recovered and recycled into the process for sodium bicarbonate production.

As a consequence of reactor, evaporator and crystallizer vessel size, temperature stratification may exist within the reactors and evaporators as set forth herein or the crystallizing vessels used to enhance the crystal growth, stability and yield. In order to avoid undesirable effects caused by hydrate or solvate precipitation in large vessels, the process can be performed in multiple vessels to circumvent these difficulties.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. A continuous process for producing sodium bicarbonate, sodium carbonate and ammonium sulfate, which process consists essentially of:

reacting, within a reactor, sodium sulfate in aqueous solution with ammonia and carbon dioxide to precipitate sodium bicarbonate and form a first mother liquor;

evaporating, in a first evaporation step, the first mother liquor from the precipitation of the bicarbonate to precipitate unreacted sodium sulfate, forming a second mother liquor substantially lower in sodium ion concentration than said first mother liquor;

cooling the second mother liquor from the precipitation of the unreacted sodium sulfate to precipitate a double salt of sodium sulfate/ammonium sulfate to further reduce the sodium ion concentration, forming a third mother liquor;

evaporating, in a second evaporation step, the third mother liquor from the precipitation of the double salt to precipitate ammonium sulfate in a purity of greater than approximately 75 wt %, forming a fourth mother liquor;

recirculating the double salt to the first mother liquor from the precipitation of sodium bicarbonate prior to the first evaporation step; and recirculating the fourth mother liquor to the second mother liquor from the first evaporation step to precipitate unreacted sodium sulfate.

2. A process according to claim 1, which process further comprises recycling to the reactor carbon dioxide and ammonia from the precipitation of the sodium bicarbonate prior to evaporation.

3. A process according to claim 1, wherein the content of the reactor is maintained at a temperature in the range of from about 20° C. to about 60° C.

4. A process according to claim 3, wherein the content of the reactor is maintained at a temperature of about 40° C.

5. A process according to claim 1, wherein the reactor operates under a pressure of from 0 kPa to about 1750 kPa.

6. A process according to claim 5, wherein the reactor operates at a pressure of about 700 kPa.

7. A process according to claim 1, wherein at least a part of carbon dioxide and ammonia is fed into the reactor in the liquefied form.

8. A process according to claim 1, wherein at least a part of carbon dioxide and ammonia is fed into the reactor in the gaseous form.

9. A process according to claim 1, wherein the content of the reactor is maintained at a pH of from about 7 to about 9.

10. A process according to claim 9, wherein the content of the reactor is maintained at a pH of about 8.

11. A process according to claim 10, wherein the pH is maintained by regulating the supply of carbon dioxide and/or ammonia.

12. A process according to claim 1, wherein the sodium sulfate solution is a saturated solution having a temperature of about 40° C.

13. A method of desulfurizing a sulfur containing gas stream comprising:

(a) exposing said stream to oxidizing conditions to generate a sulfur containing compound;

(b) contacting said sulfur containing compound with a sodium carbonate compound to generate sodium sulfate; and (c) processing said sodium sulfate according to the method of claim 1.

14. The method as set forth in claim 13, wherein said desulfurization results in, at least, 90 percent desulfurization of said gas stream.

15. A method of recovering sodium bicarbonate and forming gypsum from a source containing sodium sulfate, comprising the steps of:

(a) providing a source of sodium sulfate;

(b) processing said sodium sulfate in accordance with the method of claim 1;

(c) contacting said saturated solution of ammonium sulfate from the process of claim 1 with lime; and (d) precipitating gypsum.

16. The method as set forth in claim 15, further including the step of recovering ammonia.

17. The method as set forth in claim 16, wherein said step of recovering ammonia comprises condensing from a gaseous phase to a liquid phase.

* * * * *